United States Patent Office 3,766,092
Patented Oct. 16, 1973

3,766,092
CATALYST FOR PREPARATION OF
UNSATURATED NITRILES
Makoto Honda, Tokyo, Tetsuro Dozono, Kanagawa, Keizo Hirakawa and Kunihisa Aoki, Tokyo, and Nobuo Sugita, Kanagawa, Japan, assignors to Asahi Kasei Kogyo Kabushiki Kaisha, Osaka, Japan
No Drawing. Filed Jan. 21, 1971, Ser. No. 108,575
Claims priority, application Japan, Jan. 31, 1970, 45/8,238
Int. Cl. B01j 11/40, 11/82
U.S. Cl. 252—437                     4 Claims

ABSTRACT OF THE DISCLOSURE

In the preparation of unsaturated nitriles by catalytic oxidation of propylene or isobutylene with molecular oxygen in the presence of ammonia using a catalyst comprising oxides of molybdenum, bismuth and iron, the resulting unsaturated nitriles are improved in yield by use of a novel catalyst prepared by incorporating oxides of cobalt and alkali metals (at least one of sodium and potassium) into said catalyst in such a manner that the atomic ratio of Mo/Bi/Fe/Co/Na (or K) may be 12/1–11/1–9/1–6/0.5–2, wherein the sum of atoms of Bi and Co is controlled within 6–12, preferably 12/3.5–7/2–9/2–5/1/1. The catalyst is useful as an industrial catalyst having a high catalyst activity as well as long life, which is particularly suitable for use in a fluidized-bed reactor for the preparation of unsaturated nitriles from propylene and isobutylene.

This invention relates to an improvement on a process for producing unsaturated nitriles which comprises oxidizing catalytically propylene or isobutylene with molecular oxygen in the presence of ammonia. More particularly, this invention relates to a novel catalyst which consists mainly of oxides of molybdenum, phosphor, bismuth, iron, cobalt and alkali metals (at elast one of sodium and potassium).

It is well known to produce acrylonitrile or other unsaturated nitriles by oxidizing propylene or other olefinic hydrocarbons using molecular oxygen in the presence of ammonia. Belgian Patent No. 571,200, U.S. Patent No. 2,904,580 and Japanese patent publication No. 5,870/61 disclose utilization of oxides of molybdenum, phosphor and bismuth as catalysts for ammoxidation. Alternatively, Belgian Patent No. 633,450, U.S. Patent No. 3,198,750 and Japanese Patent Publication No. 24,367/65 suggest utilization of catalysts comprising oxides of antimony and uranium. However, the former catalysts are poor in selectivity of the objective unsaturated nitriles because byproducts such as carbon dioxide, carbon monooxide, acetonitrile, prussic acid and the like are produced in relatively large amounts. The former catalysts have another drawback that the catalyst activity is rapidly lowered under the reaction conditions described in these patent specifications. On the other hand, the latter catalysts are somewhat superior in the selectivity of unsaturated nitriles to the former. However, the latter catalysts are less convenient in handling because uranium is a radio-active substance.

German Patent No. 1,243,175 and Japanese patent publication No. 17,967/63 disclose catalysts wherein iron oxide is added to the oxides of molybdenum, phosphor and bismuth. According to the studies made by the present inventors of the catalysts, needle-like projections are formed on the surface of catalyst particles as bismuth content in the catalyst is decreased, though conversion to nitrile is improved. In a fluidized-bed reaction, it is difficult to obtain a stable fluidized state because conglomeration of catalyst particles is liable to occur. Furthermore, molydbenum which is the main component is lost through sublimation at considerably high rate, whereby the catalyst activity and selectivity are extremely degraded. For example, if the atomic ratio of Bi/Mo is lowered to 2/3 or less as described in U.S. Patent No. 3,044,996, dissipation loss of molybdenum is inevitably observed. On the other hand, if the atomic ratio of Bi/Mo is 2/3 or more, dissipation loss of molybdenum may be prevented to a certain extent at the sacrifice of yield of nitrile. Sublimation of molybdenum cannot substantially be avoided even if a part of bismuth is substituted with iron and the atomic ratio of (Bi+Fe)/Mo is 2/3.

An object of the invention is to provide an industrial catalyst having a high catalyst activity, particularly a long life catalyst suitable for use in a fluidized-bed reactor in a process for producing unsaturated nitriles from propylene and isobutylene.

In accordance with the present invention, a catalyst containing as constituent components oxides of molybdenum, phosphor, bismuth, iron, cobalt and alkali metals (sodium, potassium) in definite proportions is used in the reaction of propylene or isobutylene with ammonia and air or oxygen.

The present catalyst comprises oxides of molybdenum, bismuth, iron, cobalt, alkali metals (at least one of sodium and potassium) and phosphor. The present catalyst requires oxides of cobalt and alkali metals (at least one of sodium and potassium) as its indispensable components. The composition of the catalyst comprises, based on 12 atoms of molybdenum, 1–11 atoms of bismuth, 1–9 atoms of iron, 1–6 atoms of cobalt, 0.5–2 atoms of alkali metals, wherein the sum of atoms of bismuth and cobalt is within 6–12. The number of atoms of phosphor is not critical. It may be varied widely within the range usually present in the ammoxidation catalysts of the prior art.

The present catalyst may be available without a carrier. The present catalyst is preferably carried on a carrier such as silica gel, alumina, diatomaceous earth or the like when used in a fluidized-bed reactor. The amount of a carrier is preferably 70% by weight or less, particularly preferably 40–60% by weight.

The present catalyst is prepared according to the following procedure. Salts of each constituent element of the catalyst such as nitrates, carbonates or the like are dissolved in water or nitric acid. Alternatively, oxides, hydroxides or acids thereof may also be available instead of such salts. They are then adsorbed onto a conventional carrier such as silica gel, alumina, diatomaceous earth or the like. Thereafter, they are dried and heated at a temperature in the range of 500°–800° C., preferably 580°–700° C. Alternatively, the present catalyst may also be prepared by mixing the aforesaid compounds (containing their elements) dissolved in water or nitric acid with a carrier such as silica sol or the like, and then subjecting the mixture to such treatments as spray drying and heating.

The present catalyst gives an extremely high conversion to unsaturated nitriles as compared with conventional catalysts having similar compositions of molybdenum, phosphor, bismuth and iron except cobalt and alkali metals. The rate of sublimation loss of molybdenum oxides from catalyst particles is also low. No needle-like projections are observed on the surface of the catalyst of the present invention. Therefore, the present catalyst has an extremely long catalyst life.

These advantages of the present catalyst are particularly prominent when the sum of bismuth and cobalt atoms is 6 or more based on 12 molybdenum atoms. The effect of suppressing molybdenum sublimation cannot be attained even by using nickel which has the chemical properties similar to those of cobalt and iron. Selectivity to unsaturated nitriles is extremely improved by addition of alkali metals together with cobalt. It is considered that this effect is attributed to the decrease of acidic points in the catalyst caused by the addition of suitable amount of alkali metals. If alkali metals are added in excessively large amounts, iron oxides are separated from the catalyst, thereby lowering the selectivity to unsaturated nitriles of the catalyst.

The reaction mixture contains 1–2.5 moles of ammonia and 1–2.3 moles of oxygen based on 1 mole of propylene or isobutylene. Oxygen may be supplied either as air or pure oxygen diluted 5–10 times by nitrogen.

The reaction is conducted at a temperture in the range of 400°–520° C., preferably 450°–490° C. and under a pressure of 2 kg./cm.$^2$-gage or less, preferably 1 kg./cm.$^2$-gage or less. The contact time is controlled at 0.1–3.0 $\times 10^{-3}$ hour, preferably 0.3–2.0 $\times 10^{-3}$ hour.

The present reaction is effected with a fluidized-bed. Alternatively, a fixed-bed may also be available. In view of easy temperature control, the former is preferred.

The conversion of propylene or isobutylene and the yield of the reaction products shown in the examples are defined as follows:

Conversion of propylene or isobutylene (%)

$$= \frac{\text{Reacted propylene or isobutylene}}{\text{Supplied propylene or isobutylene}} \times 100$$

Yield of the product (%)

$$= \frac{\text{Weight of carbons contained in product}}{\text{Weigth of carbons contained in reacted propylene or isobutylene}} \times 100$$

TABLE 1.—TEST ON MOLYBDENUM SUBLIMATED FROM CATALYST

[Decrease in weight in air stream at 750° C. is shown in weight percent; and the result of elemental analysis verifies that the decrease in weight was caused by sublimation of MoO$_3$]

| Catalyst composition | Decrease in weight (percent) | | |
|---|---|---|---|
| | 48 hr. | 100 hr. | 200 hr. |
| Mo/Bi/Fe/Co | | | |
| 12/9/9/0 | 0.33 | 0.57 | 0.98 |
| 12/9/4.5/0 | 0.33 | | |
| 12/4.5/4.5/0 | 1.45 | 2.50 | 4.30 |
| 12/4.5/9/0 | 1.47 | | |
| 12/2.25/6.75/0 | 4.75 | | |
| 12/7/2.5/2.5 | 0.46 | | |
| 12/7/4.5/2 | 0.43 | 0.85 | 1.31 |
| 12/6/2/2 | 0.55 | | |
| 12/5/2.5 | 0.63 | | |
| 12/4.5/4.5/4.0 | 0.60 | 0.95 | 1.55 |
| 12/4/2/4 | 0.74 | | |
| 12/3.5/3.5/3.5 | 0.98 | | |

NOTE.—All the catalysts listed above contain one atom of Na and P based on 12 atoms of Mo, and also contain 50% by weight SiO$_2$.

TABLE 2

[The results of catalyst composition analysis before and after catalyst activity test]

| Catalyst composition [1] | Reaction [2] | Components (percent) | | | |
|---|---|---|---|---|---|
| | | Mo | Bi | Fe | Co |
| Mo/Bi/Fe/Co | | | | | |
| a. 12/4.5/4.5/0 | 0 | 17.82 | 14.77 | 3.95 | |
| | 30 | 17.10 | 14.70 | 3.90 | |
| b. 12/4.5/4.5/4.0 | 0 | 16.15 | 13.24 | 3.60 | 3.39 |
| | 30 | 16.08 | 13.31 | 3.62 | 3.35 |
| c. 12/7/4.5/2 | 0 | 14.48 | 18.60 | 3.17 | 1.50 |
| | 45 | 14.41 | 18.45 | 3.15 | 1.49 |

[1] All the catalysts contain one atom of Na and P based on 12 atoms of Mo, and also contain 50% by weight of SiO$_2$.
[2] Reaction represents days of reaction continued in a fluidized-bed reactor having 3 inch internal diameter. The catalysts a, b and c correspond to those of Example 14, Example 1 and Example 2, respectively.

EXAMPLE 1

A catalyst wherein an atomic ratio of Mo/Bi/Fe/Co/Na/P is 12/4.5/4.5/4.0/1/1 was prepared according to the following procedure. 0.1153 kg. of 85.0% phosphoric acid H$_2$PO$_4$ was added to 11.78 kg. of silica sol which contains 30% SiO$_2$ and has pH of 1.7. Then, an aqueous solution of ammonium molybdate was added thereto, which was prepared by dissolving 2.132 kg. of ammonium molybdate (NH$_4$)$_6$Mo$_7$O$_{34}$.4H$_2$O having 99.4% purity in 4.114 kg. of water at 80° C. and thereafter left to cool to room temperature. Further, a solution was added thereto, which was prepared by dissolving 2.205 kg. of bismuth nitrate Bi(NO$_3$)$_3$5H$_2$O having 99.0% purity, 1.855 kg. of ferric nitrate Fe(NO$_3$)$_3$ 9H$_2$O having 98.0%, purity, 1.200 kg. of cobalt nitrate Co(NO$_3$)$_2$ 6H$_2$O having 97.0% purity and 0.0421 kg. of 95% pure sodium hydroxide NaOH in 2.971 kg. of 13.29% nitric acid at 50° C. and thereafter left to cool to room temperature. The resulting raw material in the form of slurry was dried by means of injection spray in a drying chamber at 150° C. and subsequently heated at 690° C. for one hour. The catalyst thus obtained had the following composition:

| | Percent |
|---|---|
| MoO$_3$ | 24.42 |
| Bi$_2$O$_3$ | 14.82 |
| Fe$_2$O$_3$ | 5.08 |
| CoO | 4.24 |
| Na$_2$O | 0.44 |
| P$_2$O$_5$ | 1.01 |
| SiO$_2$ | 50.00 |

1.40 kg. of this catalyst was charged into a fluidized bed reactor having an internal diameter of 3 inches. The temperature of the catalyst bed was kept at 480° C., while the reactants were passed through the reactor via a premixer according to the following flow rates:

propylene—35.5 1/hour
ammonia—44.5 1/hour
air—340 1/hour

Inner linear velocity of gas was 4.24 cm./sec. based on an empty tower, apparent contact time was 1.80 $\times 10^{-5}$ hour and the pressure of the upper part of catalyst bed was 0.50 kg./cm.$^2$-gage.

The reaction conversion of propylene and the conversion of the reaction products were as follows:

| | Percent |
|---|---|
| Propylene reaction conversion | 97.2 |
| Acrylonitrile yield | 76.4 |
| Acetonitrile yield | 1.42 |
| Prussic acid yield | 8.22 |
| Acrolein yield | 0.62 |
| Carbon dioxide yield | 8.94 |
| Carbon monoxide yield | 4.36 |

EXAMPLE 2

A catalyst wherein an atomic ratio of Mo/Bi/Fe/Co/Na/P is 12/7/4.5/2/1/1 containing 50% by weight of $SiO_2$ was prepared according to the same procedure as described in Example 1. This catalyst had the following composition:

| | Percent |
|---|---|
| $MoO_3$ | 21.76 |
| $Bi_2O_3$ | 20.54 |
| $Fe_2O_3$ | 4.53 |
| $CoO$ | 1.89 |
| $Na_2O$ | 0.39 |
| $P_2O_5$ | 0.89 |
| $SiO_2$ | 50.00 |

Ammoxidation of propylene was carried out by using this catalyst in the same manner as described in Example 1. The following result was obtained:

| | Percent |
|---|---|
| Propylene reaction conversion | 95.3 |
| Acrylonitrile yield | 78.7 |
| Acetonitrile yield | 2.41 |
| Prussic acid yield | 6.30 |
| Acrolein yield | 1.05 |
| Carbon dioxide yield | 8.18 |
| Carbon monoxide yield | 3.36 |

EXAMPLES 3–9

Six kinds of catalysts having different compositions were prepared according to the same procedure as described in Example 1. They were then granulated into 10 mesh particles. 1.0 g. of the particles was charged into a fixed-bed reactor which consists of a stainless steel pipe having 4 mm. internal diameter. Ammoxidtaion of propylene was effected by passing therethrough a gas mixture wherein the mixing ratio of $C_3H_5/NH_3/O_2/N_2/H_2O$ was 1/1.30/1.95/11.57/0.85. The results are shown in Table 3.

EXAMPLE 10

0.200 kg. of the catalyst prepared in Example 2 was charged into a fluidized-bed reactor having 1.5 inch internal diameter. The temperature of the catalyst bed was kept at 480° C. The reactants were introduced into the reactor via a premixer at the following flow rates:

isobutylene—5.87 1/hour
ammonia—8.34 1/hour
air—75.8 1/hour

Inner linear velocity of gas was 5.1 cm./sec. based on an empty tower, apparent contact time was $0.81 \times 10^{-3}$ hour and the reaction pressure was atmospheric pressure.

The isobutylene conversion and the conversions to the reaction products in the reaction mentioned above were as follows:

| | Percent |
|---|---|
| Isobutylene conversion | 98.2 |
| Methacrylonitrile yield | 71.1 |
| Acetonitrile yield | 6.6 |
| Prussic acid yield | 7.2 |
| Methacrolein yield | --- |
| Carbon dioxide yield | 9.6 |
| Carbon monoxide yield | 5.5 |

EXAMPLES 11–15

Five kinds of the catalysts out of the scope of the present invention were prepared according to the same procedure as described in Example 1. The results of the reaction test of the catalyst are shown in Table 3.

EXAMPLES 16–18

Three kinds of the catalysts out of the scope of the present invention were prepared according to the same procedure as described in Example 2. The results of the reaction test of the catalysts are shown in Table 3.

TABLE 3

| Composition[1] Mo/Bi/Fe/Co/Na/P | Temperature, C. | Pressure, kg./cm.²-g. | Contact time, $10^{-3}$ hr. | Gas composition, $C_3H_6NH_3/O_2/H_2O/N_2$ | Reaction system | Propylene | Acrylonitrile | Acetonitrile | Prussic acid |
|---|---|---|---|---|---|---|---|---|---|
| | | | | | | | Percent conversion | | |
| Example: | | | | | | | | | |
| 3 | 12/6/2/2/1/1 | 450 | 0.0 | 0.67 | 1/1.3/1.95/0.85/11.57 | Fixed-bed | 97.5 | 79.0 | 1.7 | 7.0 |
| 4[2] | 12/6/2/2/1/1 | 450 | 0.0 | 0.67 | 1/1.3/1.95/0.85/11.57 | do | 96.8 | 78.5 | 2.2 | 7.0 |
| 5 | 12/3.5/5/3.5/1/1 | 450 | 0.0 | 0.67 | 1/1.3/1.95/0.85/11.57 | do | 98.5 | 79.3 | 1.3 | 6.8 |
| 6 | 12/5/2.5/5/1/1 | 450 | 0.0 | 0.49 | 1/1.3/1.95/0.85/11.57 | do | 97.9 | 78.6 | 0.8 | 6.2 |
| 7 | 12/7/2.5/2.5/1/1 | 450 | 0.0 | 0.67 | 1/1.3/1.95/0.85/11.57 | do | 97.5 | 77.5 | 1.1 | 7.6 |
| 8 | 12/4/4/2/1/1 | 450 | 0.0 | 0.49 | 1/1.3/1.95/0.85/11.57 | do | 98.0 | 78.0 | 1.5 | 6.9 |
| 9 | 12/4/9/2/1/1 | 450 | 0.0 | 0.67 | 1/1.3/1.95/0.85/11.57 | do | 98.5 | 78.5 | 2.0 | 8.2 |
| | | | | | $C_3H_6/NH_3/air/H_2O$ | | | | |
| Reference[3] | 12/9.2/9.2/0/0/1 | 463 | 0.0 | 1.47 | 1/1/8.8/5.12 | Fluidized-bed | 92.1 | 70.7 | 2.6 | 8.9 |
| Example: | | | | | | | | | |
| 11 | 12/9.2/9.2/0/0/1 | 460 | 0.50 | 1.75 | 1/1.25/9.6/0 | do | 93.0 | 71.0 | 2.2 | 9.5 |
| 12 | 12/9/9/0/0/1 | 480 | 0.50 | 1.83 | 1/1.25/9.6/0 | do | 94.1 | 71.2 | 1.6 | 9.3 |
| 13 | 12/9/4.5/0/1/1 | 480 | 0.50 | 1.80 | 1/1.25/10/0 | do | 93.5 | 70.3 | 2.1 | 9.8 |
| 14 | 12/4.5/4.5/0/1/1 | 480 | 0.50 | 1.80 | 1/1.25/10/0 | do | 95.2 | 73.5 | 2.1 | 8.2 |
| 15 | 12/2.25/6.75/0/1/1 | 480 | 0.50 | 1.80 | 1/1.25/10/0 | do | 95.5 | 74.2 | 1.9 | 8.0 |
| 16 | 12/6/2/2/0/1 | 450 | 0.0 | 0.67 | 1/1.3/1.95/0.85/11.57 | Fixed-bed | 97.7 | 72.2 | 0.8 | 7.1 |
| 17 | 12/4/2/8/1/1 | 450 | 0.0 | 0.67 | 1/1.3/1.95/0.85/11.57 | do | 97.4 | 73.3 | 2.0 | 8.5 |
| 18 | 12/4/12/2/1/1 | 450 | 0.0 | 0.49 | 1/1.3/1.95/0.85/11.57 | do | 98.7 | 69.5 | 1.8 | 10.2 |

[1] The catalysts of Examples 3–9 and Examples 11–18 contain 50.0% by weight of $SiO_2$, and the catalyst of reference contains 50.7% by weight of $SiO_2$.
[2] K is used in place of Na.
[3] Reference is Example 3 of Japanese patent publication No. 17,967/63, but the numerical values are calculated on the same basis with those of the examples of the present invention for comparative purpose.

What we claim is:

1. The catalyst comprising molybdenum oxide, bismuth oxide, iron oxide, cobalt oxide and alkali metal oxide, wherein the alkali metal is selected from the group consisting of sodium and potassium, the atomic ratio of the metals in the catalyst being about 1–11 atoms of bismuth, about 1–9 atoms of iron, about 1–6 atoms of cobalt and about 0.5–2 atoms of said alkali metal, the sum of the atoms of bismuth and the atoms of cobalt being about 6–12, based on 12 atoms of molybdenum.

2. The catalyst as claimed in claim 1 wherein the said atomic ratios are 3.5–7 atoms of bismuth, 2–9 atoms of iron, 2–5 atoms of cobalt, and 1 atom of said alkali metal, per 12 atoms of molybdenum.

3. The catalyst as claimed in claim 2, wherein said catalyst additionally contains about 1 mole of phosphorous.

4. The catalyst as claimed in claim 1, wherein said catalyst is carried on a carrier selected from the group consisting of silica gel, alumina and diatomaceous earth.

References Cited
UNITED STATES PATENTS

| | | | |
|---|---|---|---|
| 3,254,110 | 5/1966 | Sennewald et al. | 260—465.3 |
| 3,414,606 | 12/1968 | Winderl et al. | 260—465.3 |
| 3,346,617 | 10/1967 | Hiroki et al. | 260—465.3 |
| 3,211,671 | 10/1965 | Egbert | 252—456 X |

CARL F. DEES, Primary Examiner

U.S. Cl. X.R.

252—455 R, 456, 458, 459, 464; 260—465.3